United States Patent
Kim et al.

(10) Patent No.: US 9,732,187 B2
(45) Date of Patent: *Aug. 15, 2017

(54) MANUFACTURING METHOD OF POLYALKYLENE CARBONATE RESIN

(71) Applicant: LG CHEM, LTD., Seoul (KR)

(72) Inventors: Sung-Kyoung Kim, Daejeon (KR); Hyun Ju Cho, Daejeon (KR); Seong Kyun Kang, Daejeon (KR); Seung Young Park, Daejeon (KR); Hyeon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/035,458

(22) PCT Filed: Nov. 18, 2014

(86) PCT No.: PCT/KR2014/011080
§ 371 (c)(1),
(2) Date: May 9, 2016

(87) PCT Pub. No.: WO2015/072814
PCT Pub. Date: May 21, 2015

(65) Prior Publication Data
US 2016/0289379 A1 Oct. 6, 2016

(30) Foreign Application Priority Data

Nov. 18, 2013 (KR) .................. 10-2013-0140000
Nov. 18, 2014 (KR) .................. 10-2014-0160730

(51) Int. Cl.
*C08G 64/34* (2006.01)
*B01J 31/22* (2006.01)
*C08G 64/02* (2006.01)
*B01J 31/12* (2006.01)
*C08K 5/56* (2006.01)
*C08L 69/00* (2006.01)

(52) U.S. Cl.
CPC .......... *C08G 64/34* (2013.01); *B01J 31/2239* (2013.01); *C08G 64/0208* (2013.01); *B01J 2231/14* (2013.01); *B01J 2531/26* (2013.01)

(58) Field of Classification Search
CPC .................................................... C08G 64/34
USPC ........................................................ 528/405
See application file for complete search history.

(56) References Cited

U.S. PATENT DOCUMENTS

| 4,783,445 A | 11/1988 | Sun |
| 4,943,677 A | 7/1990 | Rokicki |
| 4,960,862 A | 10/1990 | Carroll et al. |
| 4,981,948 A | 1/1991 | Kawachi et al. |
| 5,026,676 A | 6/1991 | Motika et al. |
| 5,811,365 A | 9/1998 | Barry |
| 5,945,458 A | 8/1999 | Barry |
| 6,617,467 B1 | 9/2003 | Mueller et al. |
| 7,405,265 B2 | 7/2008 | Moon et al. |
| 8,507,708 B2 | 8/2013 | Dehghani et al. |
| 2003/0134740 A1 | 7/2003 | Meng et al. |
| 2004/0214718 A1 | 10/2004 | Meng et al. |
| 2005/0272904 A1 | 12/2005 | Moon et al. |
| 2009/0240025 A1 | 9/2009 | Fujimoto et al. |
| 2011/0152377 A1 | 6/2011 | Hanma et al. |

FOREIGN PATENT DOCUMENTS

| CN | 1082064 A | 2/1994 |
| CN | 1322220 A | 11/2001 |
| CN | 1692135 A | 11/2005 |
| CN | 102166516 A | 8/2011 |
| CN | 102439062 A | 5/2012 |
| CN | 102872919 A | 1/2013 |
| EP | 0358326 A1 | 3/1990 |
| EP | 2433976 A1 | 3/2012 |
| JP | 02-292328 A | 12/1990 |
| JP | 08-504163 A | 5/1996 |
| JP | 2732475 B2 | 3/1998 |
| JP | 3000064 B2 | 1/2000 |
| JP | 2005-530021 A | 10/2005 |
| JP | 2005-530022 A | 10/2005 |
| JP | 2006-002063 A | 1/2006 |
| JP | 2006-503946 A | 2/2006 |
| JP | 2007-126547 A | 5/2007 |

(Continued)

OTHER PUBLICATIONS

U.S. Appl. No. 14/917,219 claims , 2016.*
U.S. Appl. No. 14/917,898 claims, 2016.*
Kim, et al.: "Hydrothermal Synthesis of Single-Crystalline Zinc Glutarate and its Structural Determination", Chem. Mater., vol. 16, No. 16, 2004, pp. 2981-2983.
Kim, et al.: "Synthesis of Zinc Glutarates with Various Morphologies Using an Amphiphilic Template and Their Catalytic Activities in the Copolymerization of Carbon Dioxide and Propylene Oxide", Wiley InterScience, Journal of Polymer Science: Part A; Polymer Chemistry, vol. 43, Dec. 2005, pp. 4079-4088.

(Continued)

*Primary Examiner* — Duc Truong
(74) *Attorney, Agent, or Firm* — Dentons US LLP

(57) ABSTRACT

The present invention relates to a manufacturing method of a polyalkylene carbonate resin capable of suppressing agglomeration among catalyst particles during polymerization to maintain an excellent catalytic activity in a polymerization process,
  wherein the manufacturing method of a polyalkylene carbonate resin may include polymerizing epoxide and a monomer including carbon dioxide in the presence of a zinc dicarboxylate-based organic zinc catalyst and a dispersant, and the dispersant may include at least one selected from the group consisting of C1-C10 alkyl acrylate, C1-C10 alkyl methacrylate, C1-C20 monocarboxylic acid having an oxo group in a molecular structure, and a polyether-based polymer having C2-C6 alkylene oxide repeating units.

8 Claims, No Drawings

(56) References Cited

FOREIGN PATENT DOCUMENTS

| | | |
|---|---|---|
| JP | 2010-287563 A | 12/2010 |
| JP | 2012-180445 A | 9/2012 |
| JP | 2012-232287 A | 11/2012 |
| JP | 2013-212973 A | 10/2013 |
| KR | 10-1993-0003163 B1 | 4/1993 |
| KR | 10-1998-0020821 A | 6/1998 |
| KR | 10-1998-0034110 A | 8/1998 |
| KR | 10-2003-0097236 A | 12/2003 |
| KR | 10-2003-0097237 A | 12/2003 |
| KR | 10-0722380 B1 | 5/2007 |
| KR | 10-2009-0025219 A | 3/2009 |
| KR | 10-2012-0023820 A | 3/2012 |
| KR | 10-2013-0044223 A | 5/2013 |
| WO | 00/14141 A1 | 3/2000 |
| WO | 04/000912 A1 | 12/2003 |
| WO | 2010/016219 A1 | 2/2010 |
| WO | 2010/069000 A1 | 6/2010 |
| WO | 2011/004730 A1 | 1/2011 |
| WO | 2011/107577 A2 | 9/2011 |

OTHER PUBLICATIONS

"Propionic Acid", ICSC:0806, http://www.nihs.go.jp/ICSC/icssj-c/icss0806c.html, English: http://www.inchem.org/documents/icsc/icsc/eics0806.htm, 1997.

\* cited by examiner

MANUFACTURING METHOD OF POLYALKYLENE CARBONATE RESIN

This application is a National Stage Application of International Application No. PCT/KR2014/011080, filed on Nov. 18, 2014, which claims the benefit of Korean Patent Application No. 10-2013-0140000 filed on Nov. 18, 2013 and Korean Patent Application No. 10-2014-0160730 filed on Nov. 18, 2014, all of which are hereby incorporated by reference in their entirety for all purposes as if fully set forth herein.

TECHNICAL FIELD

The present invention relates to a manufacturing method of a polyalkylene carbonate resin capable of suppressing agglomeration among catalyst particles during polymerization to maintain an excellent catalytic activity in a polymerization process.

BACKGROUND

Since the industrial revolution, modern society has been built by consuming a large amount of fossil fuels, but on the other hand, carbon dioxide concentration in the atmosphere is increased, and further, this increase is more accelerated by environmental destruction such as disforestation, etc.

Global warming is caused by an increase of greenhouse gases such as carbon dioxide, freon, and methane in the atmosphere, such that it is significantly important to reduce the atmospheric concentration of carbon dioxide highly contributing to global warming, and several studies into emission regulation, immobilization, etc., have been conducted on a global scale.

Among the studies, a copolymerization of carbon dioxide and epoxide developed by Inoue, et al., is expected as a reaction for solving the problems of global warming, and has been actively researched in view of immobilization of chemical carbon dioxide and in view of the use of carbon dioxide as a carbon resource.

Particularly, a polyalkylene carbonate resin obtained by the copolymerization of carbon dioxide and epoxide has recently received significant attention as a kind of biodegradable resins.

Various catalysts for manufacturing the polyalkylene carbonate resin have been researched and suggested for a long time, and as representative examples thereof, zinc dicarboxylate-based catalysts such as a zinc glutarate catalyst, etc., in which zinc and dicarboxylic acid are combined to each other have been known.

Meanwhile, the zinc dicarboxylate-based catalyst, as a representative example, a zinc glutarate catalyst is formed by reacting a zinc precursor with a dicarboxylic acid such as a glutaric acid, etc., and has a shape of fine crystalline particle.

However, the crystalline particle shaped zinc dicarboxylate-based catalyst has many cases in which agglomeration among the catalyst particles occurs in a polymerization process, etc.

In the case where the agglomeration among the catalyst particles occurs, there is a drawback in which if a polymerization process for manufacturing a polyalkylene carbonate resin is performed, a sufficient contact area between reactants and the catalyst is not secured, such that a polymerization activity by the catalyst is not sufficiently expressed.

Due to the drawback, development of a technology which is possible to manufacture a polyalkylene carbonate resin while maintaining an excellent catalytic activity by suppressing agglomeration among catalyst particles during a polymerization process, has been continuously demanded.

SUMMARY OF THE INVENTION

The present invention provides a manufacturing method of a polyalkylene carbonate resin having advantages of suppressing agglomeration among catalyst particles during polymerization to maintain an excellent catalytic activity in a polymerization process.

An exemplary embodiment of the present invention provides a manufacturing method of a polyalkylene carbonate resin including:

polymerizing epoxide and a monomer including carbon dioxide in the presence of a zinc dicarboxylate-based organic zinc catalyst and a dispersant, wherein the dispersant includes at least one selected from the group consisting of C1-C10 alkyl acrylate, C1-C10 alkyl methacrylate, C1-C20 monocarboxylic acid having an oxo group in a molecular structure, and a polyether-based polymer having C2-C6 alkylene oxide repeating units.

Hereinafter, a manufacturing method of a polyalkylene carbonate resin according to an exemplary embodiment of the present invention, etc., will be described in more detail.

According to an exemplary embodiment of the present invention, there is provided a manufacturing method of a polyalkylene carbonate resin including: polymerizing epoxide and a monomer including carbon dioxide in the presence of a zinc dicarboxylate-based organic zinc catalyst and a dispersant, wherein the dispersant includes at least one selected from the group consisting of C1-C10 alkyl acrylate, C1-C10 alkyl methacrylate, C1-C20 monocarboxylic acid having an oxo group in a molecular structure, and a polyether-based polymer having C2-C6 alkylene oxide repeating units.

In the manufacturing method of the polyalkylene carbonate resin according to an exemplary embodiment of the present invention, a predetermined dispersant, more specifically, a specific dispersant, i.e., C1-C10 alkyl acrylate, C1-C10 alkyl methacrylate, C1-C20 monocarboxylic acid having an oxo group in a molecular structure, or a polyether-based polymer having C2-C6 alkylene oxide repeating units may be used together with the zinc dicarboxylate-based organic zinc catalyst.

As a result from the continuous experiment of the present inventors, it was confirmed that the dispersant could effectively suppress agglomeration among the catalyst particles in the manufacturing process of the polyalkylene carbonate resin by polymerizing the epoxide and the monomer including carbon dioxide.

It is thought that hydrophilic groups, for example, oxygen, carbonyl group, etc., of the dispersant may surround each catalyst particle, and the remaining hydrocarbon-based hydrophobic groups of the dispersant may suppress a contact among the catalyst particles in a reaction medium to effectively suppress agglomeration among the catalyst particles.

As described above, the agglomeration among the catalyst particles may be effectively suppressed during the polymerization process, such that the organic zinc catalyst may maintain a more uniform and finer particle state during the polymerization, and thus, an excellent activity may be expressed throughout the polymerization while contacting with the monomer in a sufficient contact area.

Therefore, according to an exemplary embodiment of the present invention, the excellent catalytic activity may be continuously maintained during the polymerization, such that the polyalkylene carbonate resin may be more effectively manufactured in an excellent yield.

On the contrary, when other materials that do not correspond to the above-described specific dispersants, for example, general mono-carboxylic acids or general acrylic acids, etc., such as propionic acid, acetic acid, etc., without an oxo group, are used, these materials do not appropriately include the hydrophilic groups or the hydrophobic groups, such that it is difficult to properly surround the catalyst particle in the polymerization, and it is difficult to effectively suppress the contact among the catalyst particles.

Accordingly, since agglomeration among the catalyst particles is not properly suppressed during the polymerization, the catalytic activity may be largely deteriorated as the polymerization reaction proceeds.

Meanwhile, hereinafter, the manufacture of the polyalkylene carbonate resin according to the manufacturing method of an exemplary embodiment of the present invention will be described in more detail.

In the manufacturing method of an exemplary embodiment of the present invention, the specific dispersant, i.e., C1-C10 or C3-C8 alkyl acrylate or alkyl methacrylate, C1-C20 or C5-C15 monocarboxylic acid having an oxo group in a molecular structure, or a polyether-based polymer having C2-C6 or C2-C4 alkylene oxide repeating units may be used. More specific examples of the dispersant may include hexyl methacrylate, 3,5-dioxohexanoic acid, 3,5,7-trioxo-dodecanoic acid, a propylene oxide (PO)-ethylene oxide (EO) block copolymer, etc., and two or more selected therefrom may be used together.

Due to the use of the specific dispersant, the agglomeration among the organic zinc catalyst particles may be more effectively suppressed and the catalytic activity may not be inhibited.

Further, in the manufacturing method of the polyalkylene carbonate resin, the zinc dicarboxylate-based organic zinc catalyst is used, wherein the zinc dicarboxylate-based organic zinc catalyst may be a catalyst obtained by reacting a zinc precursor with C3-C20 aliphatic dicarboxylic acid or C8-C40 aromatic dicarboxylic acid.

More specifically, in the manufacture of the organic zinc catalyst, as the zinc precursor, all of any zinc precursor that has been previously used for manufacturing the zinc dicarboxylate-based catalyst, for example, zinc oxide, zinc hydroxide, zinc acetate ($Zn(O_2CCH_3)_2$), zinc nitrate ($Zn(NO_3)_2$), zinc sulfate ($ZnSO_4$), etc., may be used without particular limitation.

Further, as the aliphatic dicarboxylic acid or aromatic dicarboxylic acid reacting with the zinc precursor, any C3-C20 aliphatic dicarboxylic acid or any C8-C40 aromatic dicarboxylic acid may be used. More specifically, an aliphatic dicarboxylic acid selected from the group consisting of a malonic acid, a glutaric acid, a succinic acid, and an adipic acid, or an aromatic dicarboxylic acid selected from the group consisting of a terephthalic acid, an isophthalic acid, a homophthalic acid, and a phenylglutaric acid may be used.

However, in view of an activity, etc., of the organic zinc catalyst, it is more preferred to use a glutaric acid as the aliphatic dicarboxylic acid, such that the zinc dicarboxylate-based organic zinc catalyst becomes a zinc glutarate-based catalyst.

In addition, the aliphatic dicarboxylic acid may be used at about 1.0 to 1.5 molar ratio or about 1.1 to 1.4 molar ratio relative to 1 mol of the zinc precursor.

Accordingly, agglomeration among the catalyst particles in the manufacturing process of the catalyst may be more effectively suppressed while securing appropriate production of the zinc dicarboxylate-based catalyst having an excellent activity, such that the catalyst having a more uniform and finer particle size and showing an excellent activity may be appropriately manufactured.

Meanwhile, the manufacture of the organic zinc catalyst by the reaction of the zinc precursor and the dicarboxylic acid may be performed in a liquid medium, and the liquid medium may be any organic solvent that is known to be capable of uniformly dissolving or dispersing the zinc precursor and/or the dicarboxylic acid.

Specific examples of the organic solvent may include at least one organic solvent selected from the group consisting of toluene, DMF (dimethyl formamide), ethanol, and methanol.

In addition, the reaction step of the zinc precursor and the dicarboxylic acid may be performed at a temperature of about 30 to 110° C. for about 5 to 24 hours.

The organic zinc catalyst manufactured with the condition may show an excellent catalytic activity together with a more uniform and finer particle size.

The above-described organic zinc catalyst may have a uniform particle shape with a finer average particle size of about 0.3 to 1.0 µm, or about 0.3 to 0.8 µm, or about 0.5 to 0.7 µm, and a particle size standard deviation of about 0.3 µm or less, or about 0.05 to 0.3 µm, or about 0.05 to 0.2 µm, or about 0.05 to 0.1 µm.

In particular, due to the use of the dispersant during the polymerization process, the uniform and fine particle size may be maintained even during the polymerization process for manufacturing the polyalkylene carbonate resin, and accordingly, a sufficient contact area with reactants such as the monomer, etc., may be maintained throughout the polymerization, and an excellent catalytic activity may be expressed during the polymerization.

As a result, the polyalkylene carbonate resin may be manufactured in a higher yield according to an exemplary embodiment of the present invention.

Meanwhile, in the manufacturing method of the polyalkylene carbonate resin according to the above-described exemplary embodiment of the present invention, the organic zinc catalyst may be used in a non-uniform catalyst form, and the polymerization step may be performed in an organic solvent by solution polymerization.

Accordingly, a heat of reaction may be appropriately controlled, and a molecular weight or a viscosity of the polyalkylene carbonate resin to be preferably obtained may be easily controlled.

In the solution polymerization, as the solvent, at least one selected from the group consisting of methylene chloride, ethylene dichloride, trichloroethane, tetrachloroethane, chloroform, acetonitrile, propionitrile, dimethylformamide, N-methyl-2-pyrrolidone, dimethyl sulfoxide, nitromethane, 1,4-dioxane, hexane, toluene, tetrahydrofuran, methyl ethyl ketone, methyl amine ketone, methyl isobutyl ketone, acetone, cyclohexanone, trichloroethylene, methyl acetate, vinyl acetate, ethyl acetate, propyl acetate, butyrolactone, caprolactone, nitropropane, benzene, styrene, xylene, and methyl propasol may be used.

Among these examples of the solvent, when methylene chloride or ethylene dichloride is used as the solvent, the polymerization reaction may be more effectively performed.

The solvent may be used at a weight ratio of about 1:0.5 to 1:100 preferably, at a weight ratio of about 1:1 to 1:10 relative to the epoxide.

Here, when the ratio is less than about 1:0.5, which is excessively small, the solvent does not appropriately function as a reaction medium, such that it may be difficult to obtain the above-described advantages of the solution polymerization.

Further, when the ratio is more than about 1:100, the concentration of epoxide, etc., is relatively decreased, such that productivity may be deteriorated, and a molecular weight of a finally formed resin may be decreased, or a side reaction may be increased.

Further, the organic zinc catalyst may be added at a molar ratio of about 1:50 to 1:1000 relative to the epoxide.

More preferably, the organic zinc catalyst may be added at a molar ratio of about 1:70 to 1:600, or about 1:80 to 1:300 relative to the epoxide.

When the molar ratio is excessively small, it is difficult to show a sufficient catalytic activity at the time of the solution polymerization. On the contrary, when the molar ratio is excessively large, since an excessive amount of the catalyst is used, the reaction is not efficiently performed, by-products may occur, or back-biting of the resin by heating in the presence of the catalyst may occur.

Meanwhile, as the epoxide, at least one selected from the group consisting of C2-C20 alkylene oxide unsubstituted or substituted with halogen or C1-C5 alkyl group; C4-C20 cycloalkylene oxide unsubstituted or substituted with halogen or C1-C5 alkyl group; and C8-C20 styrene oxide unsubstituted or substituted with halogen or C1-C5 alkyl group may be used.

Representatively, as the epoxide, C2-C20 alkylene oxide unsubstituted or substituted with halogen or C1-C5 alkyl group may be used.

Specific examples of the epoxide include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octene, epifluorohydrine, epichlorohydrine, epibromohydrine, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxy norbornene, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, and the like.

As the most representative example, ethylene oxide is used as the epoxide.

In addition, the above-described solution polymerization may be performed at about 50 to 100° C. and about 15 to 50 bar for about 1 to 60 hours.

Further, it is more preferable to perform the solution polymerization at about 70 to 90° C. and about 20 to 40 bar for about 3 to 40 hours.

Meanwhile, since the remaining polymerization process and condition except for the above description may follow general polymerization condition, etc., for manufacturing the polyalkylene carbonate resin, additional descriptions thereof will be omitted.

According to the present invention, due to the use of the specific dispersant, agglomeration among the catalyst particles may be effectively suppressed in the manufacturing process of the polyalkylene carbonate resin by polymerizing the epoxide and the monomer including carbon dioxide.

Accordingly, the organic zinc catalyst may maintain a more uniform and finer particle state during the polymerization process, and thus, an excellent activity may be expressed throughout the polymerization while contacting with the monomer in a sufficient contact area.

Therefore, according to an exemplary embodiment of the present invention, the excellent catalytic activity may be continuously maintained during the polymerization, such that the polyalkylene carbonate resin may be more effectively manufactured in an excellent yield.

DETAILED DESCRIPTION OF THE EMBODIMENTS

Hereinafter, preferable Examples of the present invention will be provided for better understanding of the present invention.

However, the following Examples are provided only for illustration of the present invention, and should not be construed as limiting the present invention by the examples.

Manufacture Example 1: Manufacture of Organic Zinc Catalyst 6.6 g (0.05 mol) of a glutaric acid and 0.1 mL of acetic acid were added to 100 mL of toluene in a 250 mL size round bottom flask, and dispersed under reflux.

Then, the mixture was heated at a temperature of 55° C. for 30 minutes, and 4.1 g (0.05 mol) of ZnO was added to 50 mL of toluene, and dispersed. The obtained product was added to the glutaric acid dispersion, and stirred for 3 hours.

Next, the mixture was heated at 110° C. for 4 hours.

A white solid was produced, filtered and washed with acetone/ethanol, and dried in a vacuum oven at 130° C.

According to the above-described method, the organic zinc catalyst of Manufacture Example 1 was manufactured, and a chemical structure thereof was confirmed.

Further, the organic zinc catalyst of Manufacture Example 1 was confirmed by SEM analysis. As a result, it was confirmed that the organic zinc catalyst of Manufacture Example 1 had an average particle size of about 0.6 μm and a particle size standard deviation of about 0.18 μm.

Example 1

First, 0.4 g of the catalyst of Manufacture Example 1, 10 mg of a dispersant (hexyl methacrylate) and 8.52 g of dichloromethane (methylene chloride) were added to a high-pressure reactor in a glove box, and 8.9 g of ethylene oxide was added thereto.

Then, the mixture was pressed in the reactor by a pressure of 30 bar using carbon dioxide.

The polymerization reaction was performed at 70° C. for 3 hours.

After the reaction was completed, unreacted carbon dioxide and ethylene oxide were removed together with dichloromethane which is a solvent.

In order to measure an amount of the manufactured polyethylene carbonate, the remaining solid was completely dried and quantified.

An activity and a yield of the catalyst according to the polymerization results were shown in Table 1 below.

Example 2

Polyethylene carbonate of Example 2 was manufactured in the same manner as Example 1 except for using 10 mg of 3,5,7-trioxo-dodecanoic acid instead of using the hexyl methacrylate as the dispersant in Example 1.

In order to measure an amount of the manufactured polyethylene carbonate, the remaining solid was completely dried and quantified.

An activity and a yield of the catalyst according to the polymerization results were shown in Table 1 below.

Example 3

Polyethylene carbonate of Example 3 was manufactured in the same manner as Example 1 except for using 10 mg of 3,5-dioxohexanoic acid instead of using the hexyl methacrylate as the dispersant in Example 1.

In order to measure an amount of the manufactured polyethylene carbonate, the remaining solid was completely dried and quantified.

An activity and a yield of the catalyst according to the polymerization results were shown in Table 1 below.

Example 4

Polyethylene carbonate of Example 4 was manufactured in the same manner as Example 1 except for using 10 mg of propylene oxide (PO)-ethylene oxide (EO) block copolymer (Mw: 8000; Sigma-Aldrich Co., Ltd.) instead of using the hexyl methacrylate as the dispersant in Example 1.

In order to measure an amount of the manufactured polyethylene carbonate, the remaining solid was completely dried and quantified.

An activity and a yield of the catalyst according to the polymerization results were shown in Table 1 below.

Comparative Example 1

Polyethylene carbonate of Comparative Example 1 was manufactured in the same manner as Example 1 except for not using a dispersant.

In order to measure an amount of the manufactured polyethylene carbonate, the remaining solid was completely dried and quantified.

An activity and a yield of the catalyst according to the polymerization results were shown in Table 1 below.

Comparative Example 2

Polyethylene carbonate of Comparative Example 2 was manufactured in the same manner as Example 1 except for using 10 mg of propionic acid instead of using the hexyl methacrylate as the dispersant in Example 1.

In order to measure an amount of the manufactured polyethylene carbonate, the remaining solid was completely dried and quantified.

An activity and a yield of the catalyst according to the polymerization results were shown in Table 1 below.

TABLE 1

|  | Kinds of dispersant in polymerization | Yield (g) | Activity of catalyst (g-polymer/g-catalyst) |
|---|---|---|---|
| Example 1 | Hexyl methacrylate, | 17.3 | 43.3 |
| Example 2 | 3,5,7-trioxo-dodecanoic acid | 16.6 | 41.5 |
| Example 3 | 3,5-dioxohexanoic acid | 15.8 | 39.5 |
| Example 4 | PO-EO block copolymer | 16.2 | 40.5 |
| Comparative Example 1 | None | 13.5 | 33.8 |
| Comparative Example 2 | Propionic acid | 8.9 | 22.3 |

Referring to Table 1 above, it was confirmed that even though Examples 1 to 4 used the same catalyst as Comparative Examples 1 and 2, an excellent activity was maintained and expressed during polymerization, and polyethylene carbonate was capable of being manufactured in an excellent yield.

It is thought that due to the use of the specific dispersant, agglomeration among the catalyst particles is effectively suppressed in the polymerization process, and as a result, an excellent catalyst activity is not inhibited during the polymerization process.

On the contrary, it is thought that the propionic acid used in Comparative Example 2 does not effectively suppress agglomeration among the catalyst particles during the polymerization, and as a result, relative deterioration of the catalytic activity is significantly shown in Comparative Example 2.

What is claimed is:

1. A manufacturing method of a polyalkylene carbonate resin comprising:
   polymerizing epoxide and a monomer including carbon dioxide in the presence of a zinc dicarboxylate-based organic zinc catalyst and a dispersant,
   wherein the dispersant includes at least one selected from the group consisting of C1-C10 alkyl acrylate, C1-C10 alkyl methacrylate, C1-C20 monocarboxylic acid having an oxo group in a molecular structure, and a polyether-based polymer having C2-C6 alkylene oxide repeating units.

2. The manufacturing method of claim 1, wherein:
   the dispersant includes at least one selected from the group consisting of hexyl methacrylate, 3,5-dioxohexanoic acid, 3,5,7-trioxo-dodecanoic acid, and a propylene oxide (PO)-ethylene oxide (EO) block copolymer.

3. The manufacturing method of claim 1, wherein:
   the zinc dicarboxylate-based organic zinc catalyst is a catalyst obtained by reacting a zinc precursor with C3-C20 aliphatic dicarboxylic acid or C8-C40 aromatic dicarboxylic acid.

4. The manufacturing method of claim 3, wherein:
   the aliphatic dicarboxylic acid or the aromatic dicarboxylic acid includes a dicarboxylic acid selected from the group consisting of malonic acid, glutaric acid, succinic acid, adipic acid, terephthalic acid, isophthalic acid, homophthalic acid and phenylglutaric acid.

5. The manufacturing method of claim 3, wherein:
   the zinc precursor includes zinc oxide, zinc hydroxide, zinc acetate ($Zn(O_2CCH_3)_2$), zinc nitrate ($Zn(NO_3)_2$) or zinc sulfate ($ZnSO_4$).

6. The manufacturing method of claim 3, wherein:
   the aliphatic dicarboxylic acid or the aromatic dicarboxylic acid is used and reacted at 1.0 to 1.5 molar ratio relative to 1 mol of the zinc precursor.

7. The manufacturing method of claim 1, wherein:
   the zinc dicarboxylate-based organic zinc catalyst is used for the polymerization, as a particle shape in which an average particle size is 0.3 to 1.0 μm, and a particle size standard deviation is 0.3 μm or less.

8. The manufacturing method of claim 1, wherein:
   the manufacturing method is performed in an organic solvent by solution polymerization.

* * * * *